United States Patent [19]

Pannell

[11] 4,078,999

[45] Mar. 14, 1978

[54] PURIFICATION OF POLYCARBONATE SOLUTION

[75] Inventor: Calvin E. Pannell, Walnut Creek, Calif.

[73] Assignee: The Dow Chemical Company, Midland, Mich.

[21] Appl. No.: 737,810

[22] Filed: Nov. 1, 1976

[51] Int. Cl.$^2$ .............................................. B01D 11/00
[52] U.S. Cl. ................................ 210/22 C; 210/321 R
[58] Field of Search .................... 210/22, 23 F, 23 H, 210/321

[56] References Cited

U.S. PATENT DOCUMENTS

B 524,806  3/1976  Ladha et al. ..................... 210/321 R
3,228,876  1/1966  Mahon ................................. 210/22
3,228,877  1/1966  Mahon ................................. 210/22
3,244,620  4/1966  Hansen et al. ....................... 210/22

FOREIGN PATENT DOCUMENTS 1,437,969  1976  United Kingdom ................... 210/22

*Primary Examiner*—Frank A. Spear, Jr.
*Assistant Examiner*—E. Rollins Cross
*Attorney, Agent, or Firm*—Gary D. Street

[57] ABSTRACT

Substantial depletion of pyridine hydrochloride from a polycarbonate reaction solution is accomplished in a non-aqueous system by dialyzing the polycarbonate solution against a sweep solvent in a permeability separatory unit.

15 Claims, No Drawings

PURIFICATION OF POLYCARBONATE SOLUTION

BACKGROUND OF THE INVENTION

The preparation of aromatic carbonate polymers by passing phosgene into a pyridine solution of the aromatic compound is well known in the art. Pyridine has been used in the solvent polymerization of such polymers since it simultaneously acts to catalyze the reaction, acts as an acid acceptor for the hydrochloric acid reaction by-product and is also an excellent polymer solvent. Since pyridine is an expensive solvent, recovery thereof is essential in order for the process to be commercially practical. However, it is well established in the art that pyridine recovery from polycarbonate solutions is achieved only with difficulty. A water and caustic soda treatment can be used for the separation process but recovery of the pyridine hydrochloride therefrom is difficult and presents water and solid, e.g., sodium chloride, disposal problems. Moreover, in this treatment, the entire polymer solution must be treated and the desirable polymer properties may thus be affected. Other solvents alone or in combination with pyridine have been used to reduce costs; however, these methods have not simplified the separation and recovery problems.

In U.S. Pat. No. 3,144,432, for example, the use of chlorobenzene as a co-solvent with pyridine is taught. Chlorobenzene is a non-solvent for pyridine hydrochloride and about 95% of the formed pyridine hydrochloride is precipitated and can be removed by filtration. However, the remainder of the pyridine must be removed by distillation of the chlorobenzene-polymer mixture. The polymer is then recovered from the chlorobenzene solution by precipitation with a non-solvent or evaporation.

Many types of permeability separatory devices are known and a variety of separatory processes can be carried out therewith. See, for example, U.S. Pat. Nos. 3,228,876, 3,228,877, 3,422,008, 3,536,611, 3,556,991 and 3,637,467. General types of recovery operations, such as the recovery of solvents from organic solutions (column 16 of the '876 and '877 patents) and separation of various organic materials (column 6 of the '611 patent), and the specific recovery of metal salts from metal salt solutions (as in the '467 patent) are taught by these references. The '991 patent concerns the solvent extraction of aromatic hydrocarbons in conjunction with dialysis and fractionation of the extract to recover preferred extracts, such as benzene. British Pat. No. 1,437,969 teaches solvent extraction of a solute dissolved in a solvent by diffusing the solute across a membrane into a second solvent, said second solvent being immiscible with the first solvent.

However, none of the above references teach or suggest the problems or the solutions set forth herein.

It is therefore a primary object of the present invention to provide a simplified, highly efficient and non-aqueous method for the removal and recovery of pyridine hydrochloride from poly-carbonate solutions with a minimum amount of energy and cost.

It is a further object of the present invention to accomplish such pyridine hydrochloride removal by a continuous process involving a considerably improved method of separation, purification and recovery of the desired product as well as solvents and by-products.

SUMMARY OF THE INVENTION

The process of the present invention comprises contacting a solution containing a linear aromatic carbonate polymer (hereinafter sometimes referred to as "polycarbonate" or "polycarbonate solution") and pyridine hydrochloride dissolved therein with one side of a microporous membrane while circulating or passing a sweep stream of solvent on the other side of the membrane, said membrane having pores therein of a sufficient size to enable pyridine hydrochloride and sweep solvent to pass therethrough, but which are small enough to prevent passage of the polycarbonate therethrough. The polycarbonate solution is generally prepared by reaction of phosgene and an aromatic dihydroxy compound in the presence of pyridine, a molecular weight control compound such as p-tert butyl phenol and a co-solvent which is the same as the sweep-stream solvent. The pyridine hydrochloride, formed as part of the phosgene reaction, preferentially passes through the microporous membrane and diffuses into the co-solvent sweep stream to give a permeate-enriched sweep stream, hereinafter sometimes referred to as the "permeate or diffusate". The thus depleted polycarbonate feed solution contains a relatively high concentration of polycarbonate in co-solvent and is sometimes hereinafter referred to as the "dialysate or retentate".

The present invention provides for a very efficient separation, recovery and recycling system which allows for an excess of pyridine to be used in the initial polycarbonate preparation if desired.

The contact of the sweep stream on one side of the membrane and the pyridine hydrochloride-bearing polycarbonate solution on the other side is continuously maintained until substantial removal of the pyridine hydrochloride through the membrane into the sweep stream has been effected.

Ninety-nine percent or more of the pyridine hydrochloride reaction by-product can thus be removed from the polycarbonate solution according to the present invention.

DETAILED DESCRIPTION OF THE INVENTION

In the separation of liquids using permeable membrane techniques, the rate of transfer of the liquid to be separated is usually very slow. Hence, the surface area of the membrane generally must be quite large. While the well-known flat plate membrane devices or tubular membrane devices or the like can be utilized in the present invention, these devices are often unwieldy in size and suffer other disadvantages in use. The more compact permeability separatory devices utilizing hollow fiber or capillary membranes and having exceedingly large transfer areas are thus preferred for use in the present invention. These devices are well-known in the art and are typically illustrated by the patent references cited in the Background hereof.

The transfer rate of pyridine hydrochloride in the present process depends upon the dynamics of flow of the pyridine hydrochloride solute through the pores of the membrane between the polycarbonate solution and the sweep stream. Preferably, highly porous, highly permeable, molecularly permselective membranes are employed. The pore sizes can vary over a wide range, the only criteria being that they be of a sufficient size to admit pyridine hydrochloride and the sweep stream solvent, for example, methylene chloride. Typically, the molecular weights of the polycarbonates which are restricted from passage through the membrane range from about 5000 to about 10,000 or higher. The pore radius size required to restrict passage of a 5000 mol weight polymer is about 27A; obviously, the low molecular weight materials desired to be separated herein would readily pass through such a membrane.

A variety of microporous membrane materials may be used, the choice of membrane depending upon the size of pores in the membrane, permeability, stability with respect to the polycarbonate solution and to the sweep stream solvents employed, volume and degree of pyridine hydrochloride contamination of polycarbonate solution and the like. Any microporous membrane material having pores of a size range sufficient to allow the passage of pyridine hydrochloride and co-solvent therethrough but of a size which substantially, if not completely, blocks passage of the polycarbonate polymer can be utilized in the present process. Of course, the membrane integrity must also remain intact and not be dissolved or destroyed during any contact with the foregoing. The membrane can be hydrophobic or hydrophilic. Typical membrane materials include, for example, regenerated cellulose, poly-4-methylpentene-1, olefins such as polyethylene, polypropylene and the like, chlorotrifluoro ethylene, polyvinylidene fluoride-polystyrene sulfonic acid, and the like. A preferred membrane includes regenerated cellulose. Another preferred membrane is poly-4-methylpentene-1. Microporous polyethylene is also preferred, and can be prepared according to pending U.S. patent application Ser. No. 619,431. In view of the known properties of the available membrane materials, the pore size classifications thereof, and numerous references concerning the preparation of microporous membranes, those skilled in the art will be able to readily determine the optimum membrane material, membrane area, etc., required for the process of the present invention.

The optimum dimensions for the particular membranes utilized will likewise be readily apparent to those skilled in the art. Where hollow fiber membranes are utilized, the fibers should preferably have an outside diameter of less than about 300 microns, most preferably from about 20 to about 100 microns. The uniform wall thicknesses of the fiber can range from about 1 to about 60 microns, preferably from about 2 to about 30 microns.

The sweep stream solvent, which is the same as the co-solvent used in the preparation of the polycarbonate in question, must be one in which the pyridine hydrochloride and polycarbonate compound are soluble and which does not affect the integrity of the membrane material utilized. Representative co-solvent and sweep stream media include, for example, methylene chloride, dioxane, glycol ethers and the like.

Polycarbonate resins made from 4,4'-isopropylidenediphenol (Bisphenol A) have been known in the art for some time and improved polycarbonate and copolycarbonate resins made with phenolphthalein are also known in the art. These particular types of polycarbonate resins can be purified according to the process of the present invention and treatment of polycarbonate solutions containing the same constitutes a preferred embodiment herein. Of course, it is to be understood that the invention is applicable to a wide variety of related and well known dihydroxy aromatic compounds such as those represented by the following formula:

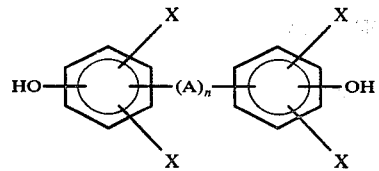

wherein A is a divalent hydrocarbon radical containing 1–15 carbon atoms,

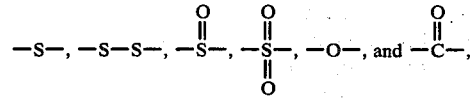

X is independently hydrogen, chlorine, bromine, fluorine, or a monovalent hydrocarbon radical such as an alkyl group of 1–4 carbons, an aryl group of 6–8 carbons and an oxyaryl group 6–8 carbons and $n$ is 0 or 1.

In operations utilizing the preferred embodiment of hollow fiber membranes, the polycarbonate solution is passed over the exterior or outside of the fibers and the sweep stream solvent is fed through the interior or core of the hollow fiber. The solute transfer or permeation of the pyridine hydrochloride takes place through pores in the membrane walls. The solute transfer can be made to proceed in a reverse, inside-out manner if so desired. Contact of the membrane material, in whatever form or mode of operation, is usually carried out at ambient pressures and temperatures.

The contact of the extracting sweep stream solvent on one side of the membrane with the polycarbonate solution on the other is continuously maintained until substantial removal of pyridine hydrochloride through the membrane has been effected. Regeneration of the sweep stream solvent and separation and recovery of the pyridine and hydrochloric acid for recycling can be accomplished by utilizing conventional techniques. Accordingly, the loss of pyridine catalyst and hydrochloric acid reactants used in preparing polycarbonates is minimal and the present invention constitutes an important economic advantage. Moreover, the recovery of these valuable reactants can be accomplished without exposing the desired polycarbonate polymers to possible deleterious washing and separation steps usually employed.

The following examples will illustrate in greater detail the practice of the present invention, but should not be construed as fully delineating the scope of this discovery.

EXAMPLE 1

A separatory cell of the type described in FIG. 1 of U.S. Pat. No. 3,228,877 (referenced hereinabove) and having about 140 hollow fibers was utilized to purify a crude polycarbonate solution. The hollow fibers were regenerated cellulose and had an internal diameter of about 50 microns, with a wall thickness of about 25 microns. The fiber lengths, e.g., the length of fiber available inside the device for permeation, was about 20 centimeters. The membrane area was 176 cm².

The crude solution, a reaction mixture comprising a phenolphthalein polycarbonate resin, was prepared in typical procedures by the reaction of phenolphthalein (60 mole %), 4,4'-isopropylidenediphenol (Bisphenol A) (40 mole %), pyridine catalyst (300 mole %), hydrochloric acid (200 mole %), sufficient methylene chloride to ensure all pyridine hydrochloride was dissolved, phosgene (115 mole %) and p-tert butylphenol (3 mole %).

A portion of the above reaction mixture solution was then circulated through the hollow fiber unit around the exterior of the fibers at a rate of 2 milliliters per minute while methylene chloride was circulated through the interior of the hollow fibers. Progress of the pyridine hydrochloride depletion rate was monitored by testing the so-treated polycarbonate solution for chloride ion by adding an isopropanol/silver nitrate solution. A one ml. control sample of the solution was tested prior to the treatment (e.g., "0" hour) in the unit and required 27.7 ml. of 0.01N silver nitrate solution to neutralize the chloride, indicating a high pyridine hydrochloride content in the solution. The progress of the purification treatment was similarly monitored by periodic analysis of the treated solution for chloride ion as follows:

| Time/Hours | ml. 0.01N $A_gNO_3$ |
|---|---|
| 0 | 27.7 |
| 15 | 12.25 |
| 24 | 6.46 |
| 48 | 1.18 |
| 72 | 0.18 |
| 96 | 0.07 |
| 120 | 0.035 |
| 144 | 0.025* |

*indicates 99.91% of chloride ion removed.

The thus treated polycarbonate solution was then treated in typical procedures with hexane, isolated and vacuum-dried. The properties of the thus treated polymer were then compared with those of a second portion of the original polycarbonate solution, which had been purified by conventional (aqueous wash) procedures and isolated. The properties were found to be substantially equivalent.

The foregoing example illustrates the effectiveness of the present invention in accomplishing nearly complete removal of the pyridine hydrochloride from the polycarbonate solution. The sweep stream containing the pyridine hydrochloride can further be treated in conventional techniques to recover the pyridine and hydrochloric acid for reuse. Removal of the pyridine hydrochloride from the polycarbonate solution can, of course, be accomplished in a much shorter time period than the foregoing example by utilizing devices with larger membrane surface area and/or membranes of greater porosity. By determining the chloride ion transport rate across a given membrane in a simple test and calculating the transfer rate across the membrane, those skilled in the art can readily determine the optimum size unit and flow rate for a given desired operation. For example, a separatory unit of the type employed in the preceding example having a membrane surface area of about one square meter would require only about 4 hours to remove about 99.9% of the pyridine hydrochloride from a two pound per hour polymer production stream.

What is claimed is:

1. A method for removing pyridine hydrochloride from a polycarbonate solution comprising contacting said solution with one side of a porous membrane while passing a sweep stream on the other side of the membrane, said membrane being selectively permeable to pyridine hydrochloride and the sweep stream, wherein said solution is separated into a dialysate of high polycarbonate concentration and an enriched sweep stream of pyridine hydrochloride.

2. The method of claim 1 wherein the process is carried out until substantially all of the pyridine hydrochloride is removed from the polycarbonate solution.

3. The method of claim 1 wherein the process is carried out until at least 99% of the pyridine hydrochloride is removed from the polycarbonate solution.

4. The method of claim 2 wherein the process is carried out continuously.

5. The method of claim 3 wherein the process is carried out continuously.

6. The method of claim 1 wherein the sweep stream comprises methylene chloride, dioxane, glycol ethers or the like.

7. The method of claim 1 wherein the polycarbonate solution being treated comprises a polycarbonate resin made from 4,4'-isopropylidene diphenol alone or in combination with phenolphthalein.

8. The method of claim 1 wherein the polycarbonate solution being treated comprises a copolycarbonate resin with phenolphthalein.

9. The method of claim 5 wherein the polycarbonate solution being treated comprises a copolycarbonate resin with phenolphthalein.

10. The method of claim 1 wherein the sweep stream is methylene chloride.

11. The method of claim 9 wherein the sweep stream is methylene chloride.

12. The method of claim 1 wherein said membrane is regenerated cellulose.

13. The method of claim 1 wherein said membrane is poly-4-methylpentene-1.

14. The method of claim 8 wherein said membrane is regenerated cellulose.

15. The method of claim 8 wherein said membrane is poly-4-methylpentene-1.

* * * * *